April 16, 1935.  J. S. EDWARDS  1,998,001
SEMITRAILER
Filed Sept. 25, 1934  4 Sheets-Sheet 1
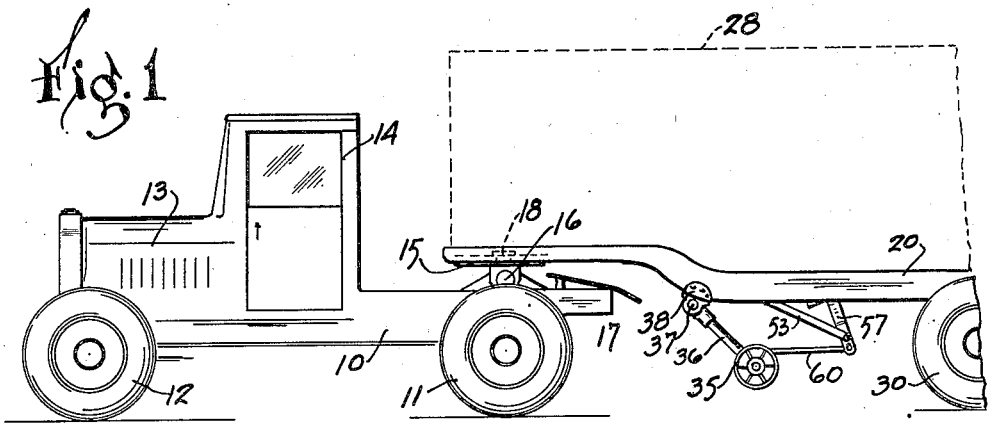
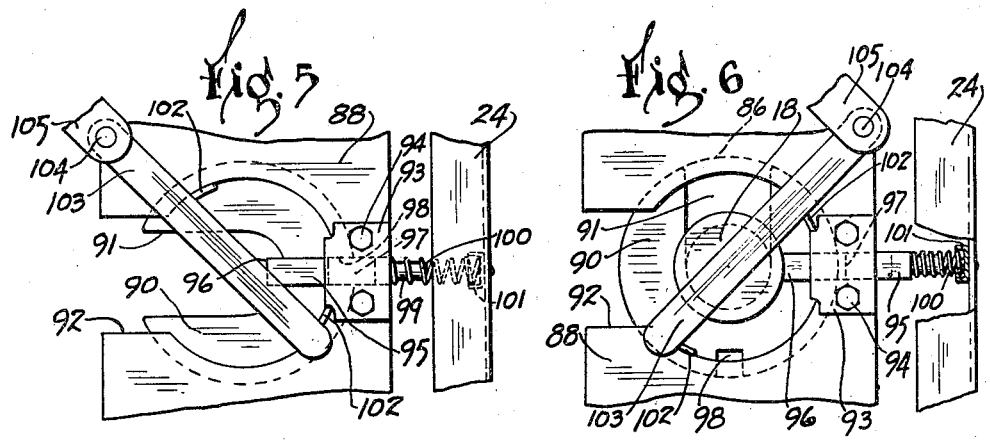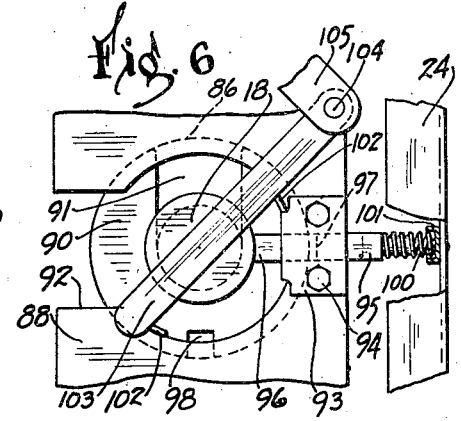
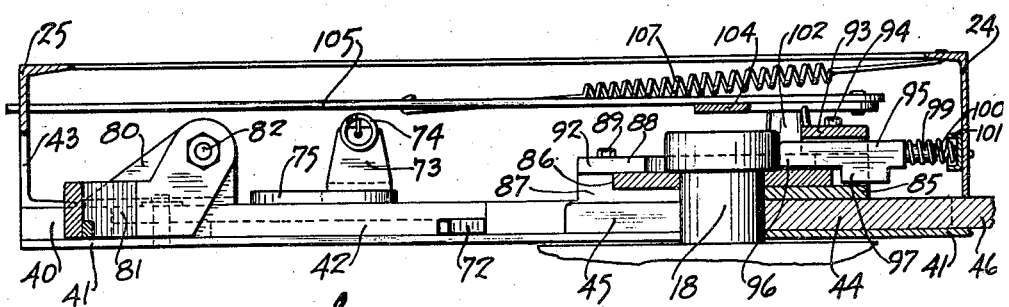
INVENTOR.
John S. Edwards
BY
ATTORNEY.

April 16, 1935. J. S. EDWARDS 1,998,001
SEMITRAILER
Filed Sept. 25, 1934 4 Sheets-Sheet 2
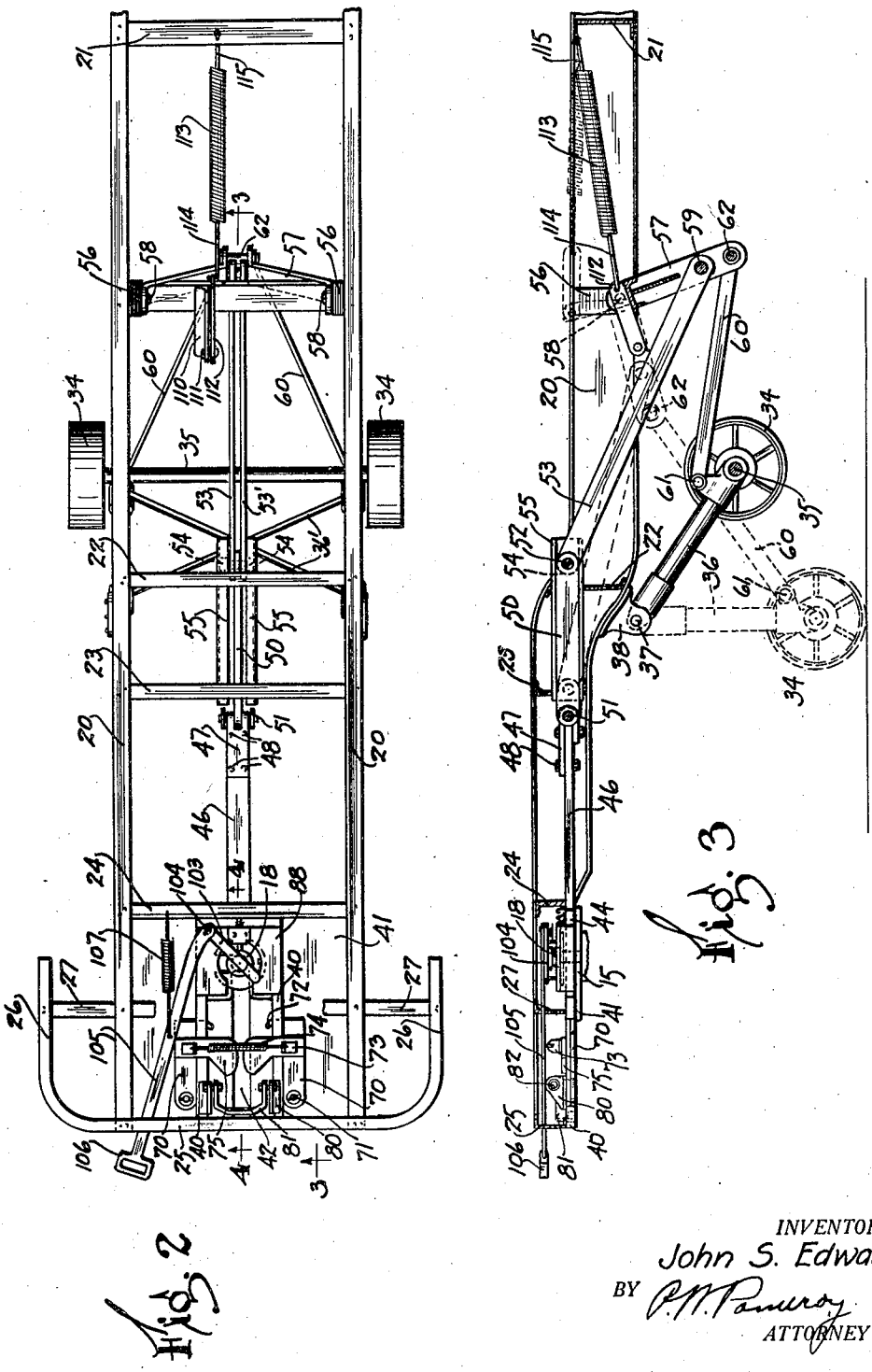
INVENTOR.
John S. Edwards.
BY
ATTORNEY April 16, 1935.  J. S. EDWARDS  1,998,001
SEMITRAILER
Filed Sept. 25, 1934  4 Sheets-Sheet 3
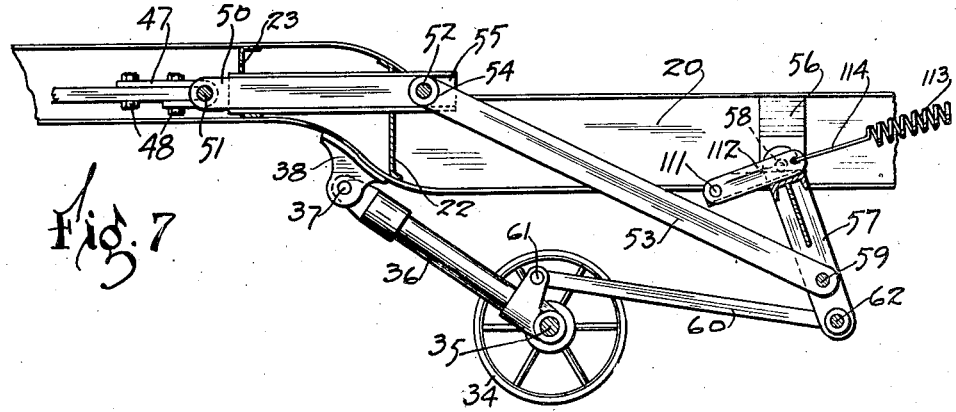
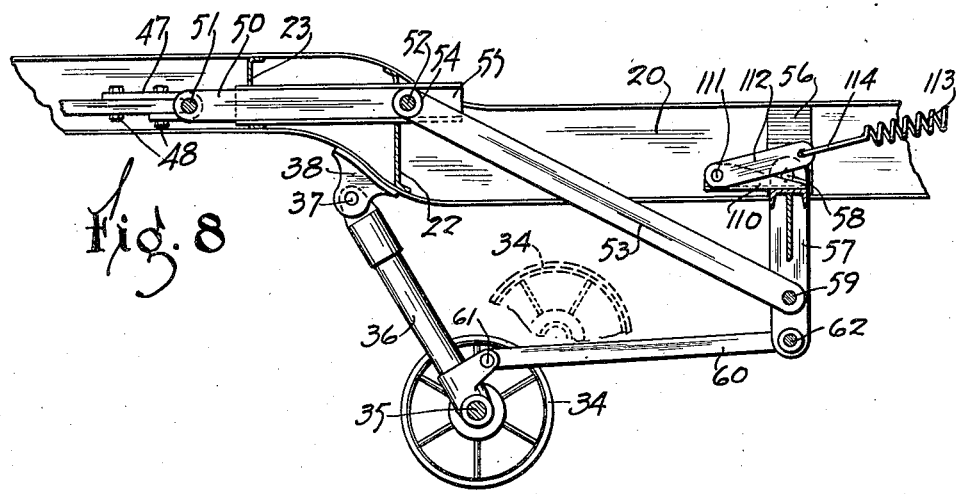
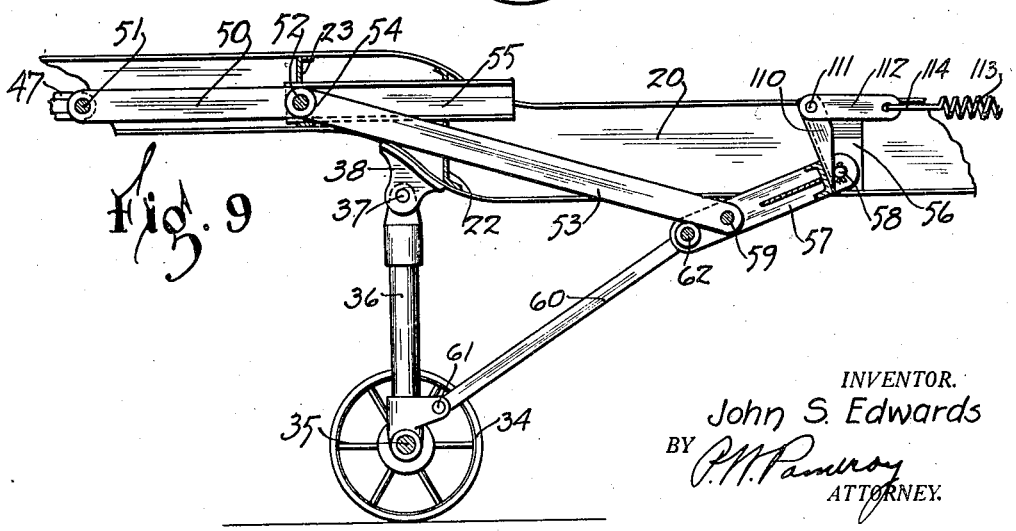
INVENTOR.
John S. Edwards
BY
ATTORNEY.

April 16, 1935.  J. S. EDWARDS  1,998,001
SEMITRAILER
Filed Sept. 25, 1934    4 Sheets—Sheet 4
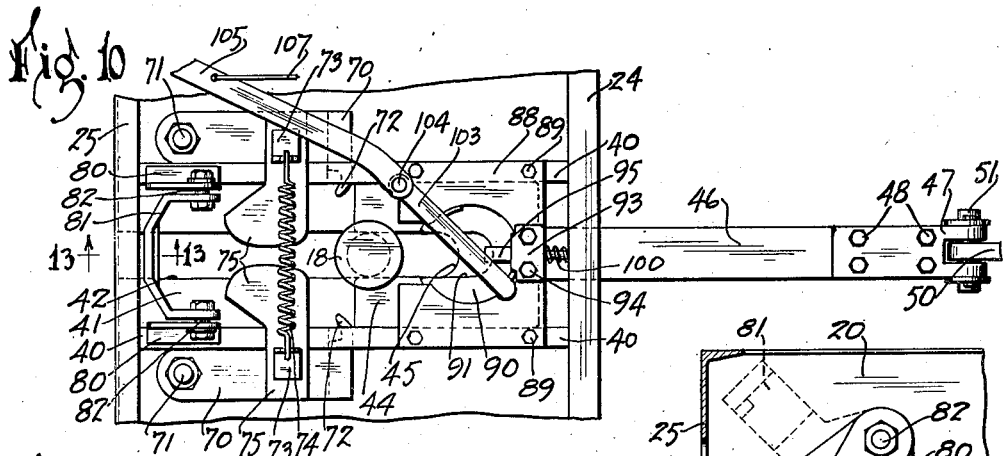
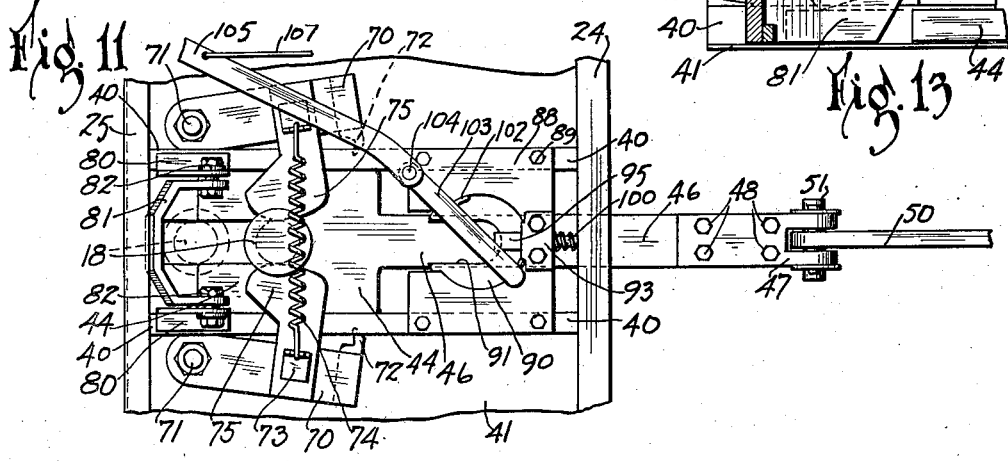
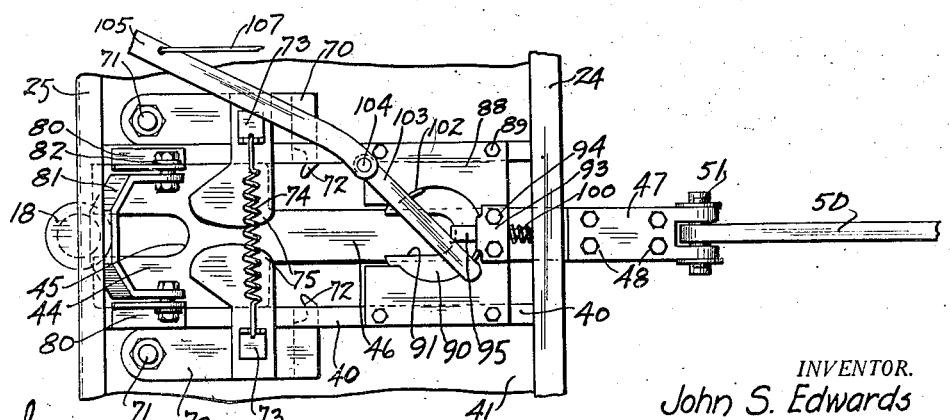
INVENTOR.
John S. Edwards
BY
ATTORNEY.

Patented Apr. 16, 1935

1,998,001

UNITED STATES PATENT OFFICE 1,998,001

SEMITRAILER

John S. Edwards, South Bend, Ind., assignor to Edwards Iron Works, Incorporated, South Bend, Ind., a corporation of Indiana Application September 25, 1934, Serial No. 745,440

18 Claims. (Cl. 280—33.1)

This invention relates to a tractor and semi-trailer combination and particularly to the coupling means therefor, the principal object being to provide means to automatically raise the drop wheels pivotally attached to the trailer during the operation of coupling the tractor and trailer together.

Another object is to automatically raise the drop wheels forming a part of the trailer from ground-engaging or operative position to folded or inoperative position by the rearward movement of the king pin attached to the tractor and to lower the drop wheels from inoperative to operative positions part way by gravity and then completing the operation by spring action.

Another object is to provide means whereby the drop wheels forming a part of the trailer are lowered from folded or inoperative position to ground-engaging or operative position independently of the forward movement of the king pin attached to the tractor.

Still another object is to provide a safety latch whereby the tractor cannot be disconnected from the trailer until the drop wheels forming a part thereof are lowered into full ground-engaging position.

Numerous and other objects, and objects relating to details of construction and method of operation will be apparent from the drawings and the detailed description to follow.

In the drawings in which like numerals refer to like parts throughout the several views:

Fig. 1 is a diagrammatic side elevational view showing a tractor and trailer coupled therewith incorporating my improved means for automatically raising and lowering the drop wheels beneath the trailer.

Fig. 2 is a top plan view of the trailer shown in Fig. 1 with the king pin forming a part of the fifth wheel carried by the tractor coupled with the trailer.

Fig. 3 is a longitudinal sectional view taken on the line 3—3 of Fig. 2, showing in full lines the drop wheels in elevated position, and in dotted lines in operative or load-carrying position.

Fig. 4 is an enlarged longitudinal sectional view taken on the line 4—4 of Fig. 2, showing the coupling mechanism and the king pin in locked position therein.

Fig. 5 is a top plan view of the coupling member in position to receive the king pin.

Fig. 6 is a view similar to Fig. 5, showing the coupling member and the king pin in locked position.

Fig. 7 is a fragmentary side elevational view, showing a portion of the trailer frame and the drop wheels therefor in elevated or inoperative position.

Fig. 8 is a view similar to Fig. 7, showing the drop wheels lowered by gravity toward full operative position.

Fig. 9 is a view similar to Fig. 8, showing the drop wheels in lowered or load carrying position.

Fig. 10 is an enlarged fragmentary top elevational view, showing a portion of the trailer frame, the coupling mechanism, the sliding carriage, a portion of the linkage adapted to be operatively connected with the drop wheels, and the king pin released and moved forwardly from the coupling member.

Fig. 11 is a view similar to Fig. 10 with the king pin moved in position to carry the sliding carriage rearwardly to lower the drop wheels.

Fig. 12 is a view similar to Fig. 10, showing the king pin just prior to entering the sliding carriage and prior to moving the same rearwardly to lower the drop wheels.

Fig. 13 is a detailed sectional view taken on the line 13—13 of Fig. 10, showing the safety latch for preventing disconnection of the tractor from the trailer until the drop wheels have been fully lowered to operative position.

To enable others to better understand the construction and mode of operation of my improved means for automatically raising and lowering the drop wheels for semi-trailers, I will first give a brief description of the general construction of the tractor and semi-trailer and will then give a detailed description of the drop wheels, together with a means for automatically raising and lowering the same.

The tractor which may be of any approved design comprises a frame 10 supported at the rear by driving wheels 11 and at the front by steering wheels 12. A power plant, not shown, may be enclosed in the hood 13 positioned forwardly of the driver's cab 14. Mounted at the rear of the frame 10 and preferably directed over the driving wheels 11 is a fifth wheel 15 which, for example, may be of the construction illustrated in my Patent No. 1,922,359, issued on August 15, 1933, and which is pivoted at 16 on to the frame 10 to tilt rearwardly from the horizontal position shown in Fig. 1 to receive the forward end of the semi-trailer presently to be described when the tractor is backed under the forward end of the semi-trailer. A guide plate 17 may also be provided, as shown in Fig. 1, to guide the forward end of the semi-trailer on to the fifth wheel 15 so as to permit engagement of the king pin 18 forming a part thereof with the coupling mechanism carried by the semi-trailer hereinafter to be more particularly described.

The semi-trailer has a frame comprising side members 20 and a plurality of intermediate cross members 21, 22, 23 and 24 and a front cross member 25, the latter preferably being extended beyond the side frame members 20 and then extending rearwardly at 26 which with the cross member 27 forms an additional support for the body 28, indicated in Fig. 1 by dotted lines. The semi-trailer is provided with rear road wheels 30 adapted to carry the rear end thereof as illustrated in Fig. 1. This construction thus far described may be of conventional design so a further detailed description thereof is not thought necessary.

I will now proceed with a detailed description of the drop wheels and the automatically operated means for raising and lowering them: A pair of drop wheels 34 are rotatably mounted on the axle 35 from which extends a pair of legs 36 pivotally connected at their upper ends at 37 to the brackets 38 riveted or otherwise suitably secured to the side frame members 20. Legs 36 are suitably braced against lateral displacement by the X members 36' (Fig. 2). As illustrated particularly in Figs. 7, 8 and 9, the legs 36 are adapted to permit the raising of the wheels 34 to the upper or inoperative position (Fig. 7), or the wheels may lower to a position whereby the legs 36 extend substantially vertical (Fig. 9), in which position the wheels are adapted to support the front end of the semi-trailer when the same is detached from the tractor.

Extending between the cross frame members 24 and 25 are a pair of spaced longitudinally extending guide members 40 which have their lower edges positioned below the frame members 24 and 25 to support a plate 41 on the bottom faces thereof. The plate 41 has a slot 42 therein extending rearwardly from the front edge thereof to permit the king pin 18 to move rearwardly into engagement with the coupling mechanism hereinafter to be described. The plate 41 also is adapted to slide on the plate 17 carried by the tractor when the tractor is backed under the semi-trailer and then to rest on the fifth wheel 15, as is best shown in Fig. 1. The cross frame member 25 is notched at 43 to permit the king pin 18 to move into coupling position, as is best shown in Fig. 4.

A block or plate 44 adapted to slide fore and aft relative to the trailer frame is supported on the plate 41, as shown in Fig. 4, and is guided by the members 40 so that a track is provided for the block during its sliding movement. The sliding block 44 has a slot 45 in its forward face to receive the king pin 18, for a purpose to be hereinafter described, and terminates in a rearwardly extending bar 46 which has a coupling member 47 secured thereto by the bolts 48. A second bar 50 is pivotally connected at 51 at its forward end to the coupling member 47 and is pivoted at 52 at its rear end to the forward ends of a pair of links 53 and 53'. The pin 52 forming the pivotal connection for the links 50 and 53— 53' also carries a pair of rollers 54 supported by the flanges of the spaced channel members 55 which are secured to the frame cross members 22 and 23. I preferably provide a pivotal connection between the bars 46 and 50 and guide the bar 50 in the channel members 55 by the rollers 54 to compensate for any inaccuracy in the construction or assembly of the parts so as to permit of free sliding movement of the block 44; however, if desired the bar 46 extending rearwardly from the sliding block 44 may be pivotally connected with the links 53 and 53'.

Filler blocks 56 are suitably attached to the side frame members 20 on which the trussed bracket or arm 57 is pivotally attached at 58 at its upper ends. The links 53 and 53' are pivotally connected at 59 at their rear ends to the bracket 57 intermediate the ends thereof, as is best shown in Fig. 3 and Figs. 7 and 9 inclusive. A pair of links 60 are each pivotally connected at 61 to the legs 36 and at their opposite ends at 62 to the bracket 57. The pivot 62 is past dead center when the drop wheels 34 are in full lowered position so that the wheels are locked against accidental rearward movement which would permit dropping of the front end of the trailer when removed from the tractor.

From the foregoing description, it will be seen that when the sliding block 44 is pushed rearwardly by the king pin 18 that the bar 50 will be caused to move rearwardly therewith, causing the links 53 and 53' to swing the bracket 57 rearwardly on its pivots 58 pulling the links 60 therewith, thus collapsing the fully extended toggle forward by the bracket 57 and the links 60 and causing the drop wheels 34 to be lifted from ground-engaging position toward the position shown in Figs. 3 and 7. Conversely, as the wheels 34 move from inoperative or folded position toward the position shown in dotted lines in Fig. 3, the links 60 connected with the legs 36 at one end and with the bracket 57 at the opposite end will cause the bracket 57 to swing about its pivots 58 in a clockwise direction and thereupon move the links 53 and 53' therewith, thus causing the bar 50, the bar 46 and the sliding head 44 connected therewith to move toward the left from the position shown in Fig. 3 or toward the front of the trailer.

A pair of arms 70 are each pivotally supported at 71 on the plate 41, each arm having an inwardly projecting stop 72 extending through a slot formed in the respective frame member 40 into the path of movement of the sliding block 44. As the block 44 moves forwardly with the drop wheels 34 as they move from inoperative to ground-engaging position, the block 44 will press against the tapered sides of the stops 72, thus swinging the arms 70 outwardly about their pivots 71 and permitting the sliding block 44 to pass between the stops 72 and move forwardly to the position shown in Fig. 12. Each of the arms 70 is provided with an upwardly extending bracket 73 to which is attached a spring 74 at its opposite ends so that the tension of the spring will normally pull the free ends of the arms 70 toward each other to abut against the frame guide members 40 and cause the stops 72 to lie in the path of movement of the sliding block 44. After the sliding block 44 has moved forwardly beyond the stops 72, they will again assume the position shown in Figs. 10 and 12 so that the stops will prevent a rearward movement of the block 44 until the stops 72 are again moved out of its path of movement. On each of the arms 70, I also provide a pair of cam members 75, as is clearly shown in Figs. 2 and 10 to 12 inclusive, which cam members are adapted to engage with the king pin 18 as the same is moved under the trailer to spread the free ends of the arms 70 against the tension of the spring 74 and thus move the stops 72 out of the path of movement of the sliding block 44.

It is desirable that the tractor should not be detached from the trailer until the drop wheels 34 are in fully lowered or ground-engaging position and the sliding block 44 has been moved to its forward position and I, therefore, provide a safety latch which will prevent separation of the tractor from the trailer until the drop wheels have been lowered and the sliding block 44 moved forwardly. I, therefore, provide brackets 80 on each of the members 40 to which a U-shaped latch member 81 is pivoted at 82, as is best shown in Fig. 13. The side arms of the U-shaped latch member 81 are preferably tapered as shown in Fig. 13 so that as the sliding block 44 moves forwardly the front edge face thereof will engage against the side arms of the U-shaped latch member 81 and swing the same upwardly to the position shown in dotted lines.

The continued forward movement of the sliding block 44 will hold the U-shaped latch member in the elevated position so that the king pin 18 will pass thereunder when the tractor is being pulled away from the trailer or backed thereunder. It will be apparent, however, that if for any reason an attempt is made to pull the tractor away from the trailer and the king pin 18 reaches the position shown in dotted lines in Fig. 11, and the sliding block 44 has not moved forwardly sufficient to raise the U-shaped latch member 81 to its elevated position, the latter will prevent the further forward movement of the king pin and thus prevent disconnection of the tractor from the trailer.

Referring now particularly to Fig. 12 and assuming that the operator desires to back the tractor under the trailer to connect the trailer with the tractor and that the sliding block 44 has been moved to its forward position, causing the latch member 81 to be elevated so that the king pin 18 is free to pass through the slot 43 formed in the front cross frame member 25 and move rearwardly along the slot 45 formed in the front face of the sliding block 44, the king pin 18 is free to enter the slot 45 and move the sliding block 44 rearwardly a slight distance before the king pin 18 passes between the cams 75 to cause the same to swing the free ends of the arms 70 outwardly to release the stops 72 to permit further rearward movement of the sliding block, thus causing the drop wheels 34 to move upwardly from ground-engaging position to inoperative position. As the king pin 18 passes between the cams 75, the stops 72 will move out of the path of movement of the sliding block 44 and permit the same to be moved rearwardly by the king pin, thus moving with it the link 59 and causing the links 53 and 53' to swing the arm 57 upwardly about its pivots 58, thus exerting a pull on the links 60 and causing the road wheels 34 to swing upwardly into inoperative position.

The coupling mechanism is preferably positioned intermediate the arms 70 and the frame cross member 24 and comprises a plate 85 which is recessed at 86 and which is provided with a slot 87 in its forward face to permit the king pin 18 to enter this member. A cover plate 88 is secured to the base plate 85 by the bolts 89. A locking member 90 having a U-shaped slot 91 formed therein is mounted in the recess 86 formed in the plate 85 and is secured in position thereon by the top plate 88. The top plate 88 is also provided with a slot 92 in its forward edge to receive the king pin 18, as is best shown in Fig. 4. On the upper face of the cover plate 88 is a guide member 93 secured thereto by the bolts 94 in which is adapted to slide the plunger 95 having a forwardly extending tongue 96, a downwardly projecting tongue 97 adapted to enter a recess 98 formed in the locking member 90, and a rearwardly projecting stud 99 preferably of smaller diameter than the main body portion thereof to provide a shoulder against which one end of the coiled spring 100 abuts, the other end abutting against a cup 101 secured to the frame cross member 24. The spring 100 normally urges the plunger 95 forwardly away from the cross member 24, as is best shown in Fig. 5, with the lower tongue 97 seating in the slot 98 formed in the locking member 90. I also provide upstanding lugs 102 on the locking member 90 to which is attached a bar or lever 103, the free end thereof being pivoted at 104 to the operating lever 105 having a handle 106 thereon projecting forwardly of the front frame cross member 25. A spring 107 is attached at one end to the operating lever 105 and at the opposite end to the frame cross member 24.

The coupling mechanism is manually operated to set the same to receive the king pin 18; that is, the operator pulls the handle 106 thereby rotating the bar 103 and with it the locking member 90 against the tension of the spring 107 to move the same to the position in Fig. 5 in which position the tongue 97 on the locking bar 95 will engage in the slot 98 formed in the coupling member 90 and the forwardly projecting tongue 96 thereof will project into the forwardly directed slot 92 in the cover member 88; that is, into the path of movement of the king pin 18. When the tractor is backed under the trailer, the king pin will be pushed against the front face of the tongue 96 on the plunger 95, thus carrying this member rearwardly so that the tongue 97 will be moved out of the notch 98 formed in the coupling member 90 whereupon the spring 107 will exert a pull on the operating lever 105 and rotate the coupling member 90 in a clockwise direction or from the position shown in Fig. 5 to that shown in Fig. 6. When in this position, the coupling member 90 will prevent removal of the king pin from its locked position and the trailer will be firmly coupled with the tractor so that the latter may be used as a hauling medium therefore. When it is desired to uncouple the trailer from the tractor, the operator will pull on the handle 106 on the operating lever 105 and thereby through the arm 103 rotate the coupling member 90 in an anti-clockwise direction from the position shown in Fig. 6 to that shown in Fig. 5 so that the slot 91 therein will be in line with the slots 87 and 92 formed respectively in the plates 85 and 88 whereupon the king pin 18 may be moved forwardly out of the coupling mechanism. When the coupling member 90 is rotated to the position shown in Fig. 5, the plunger 95 will move forwardly so that the tongue 97 thereon will engage in the slot 98 formed in the keeper member 90 to lock the same in that position and thus keep the slots 87, 91 and 92 in alignment until the king pin 18 is again moved into the coupling mechanism and the plunger 95 is again moved rearwardly to disengage the tongue 97 thereon from the slot 98 to permit clockwise rotation of the coupling member 90 from the position shown in Fig. 5 to that shown in Fig. 6.

I have previously described the drop wheels 34 and the mechanism operatively connected therewith whereby rearward movement of the sliding block 44 will cause the wheels to raise from ground-engaging or load carrying position to inoperative position and I will now describe the means for moving the wheels from inoperative position to operative or ground-engaging position.

Assuming that the drop wheels 34 are in the position shown in Fig. 3 with the king pin 18 locked in the coupling mechanism previously described and it is desired to disconnect the tractor from the trailer, the operator will pull the handle 106 on the operating lever 105 to rotate the coupling member 90 from the position shown in Fig. 6 to that shown in Fig. 5 so that the tractor can move forwardly relative to the trailer and the king pin 18 move out of the coupling mechanism. As the king pin 18 moves forwardly beyond the coupling mechanism, it will travel in advance of the sliding block 44 whereupon the drop wheels 34 are permitted to move by gravity from the position shown in Fig. 7 to substantially the position shown in Fig. 8 by their downward movement, will swing the bracket 57 downwardly and thus carry the links 53 and 53′ forwardly and with them the bar 50 in the sliding head 44. It has been found that the drop wheels 34 may not move to full ground-engaging position without assistance at the latter end of the movement and I, therefore, provide a forwardly extending arm 110 on the swinging bracket 57 to which is pivotally attached at 111 the link 112. A spring 113 is attached at its forward end 114 to the rear end of the link 112, and at its rear end 115 to the cross frame member 21. When the drop wheels 34 are in full elevated position as shown in Fig. 7, the link 112 will lie substantially parallel with the forwardly projecting arm 110 secured to the swinging bracket 57 so that the spring 113 will not tend to swing the drop wheels downwardly to ground-engaging position. When, however, the drop wheels have moved from the position shown from Fig. 7 to Fig. 8 by gravity, the toggle mechanism comprising the forwardly extending arm 110 and the link 112 will have moved respectively to the position whereby the pivots therefor are past the dead center position and the spring 113 will then exert a pull on the arm 110 to swing the bracket 57 further on its pivots 58 and force the drop wheels to the full forward or ground-engaging position; that is, to the position shown in Fig. 9.

During the travel of the drop wheels 34 from the position shown in Fig. 7 to the position shown in Fig. 9, the sliding block 44 will be carried forwardly therewith and during the period of the operation when the spring 113 is exerting the influence to lower the drop wheels 34, the sliding block 44 will move the U-shaped latch member to the king pin releasing position; that is, to the dotted line position shown in Fig. 13, so that the king pin can move forwardly away from the trailer to provide the complete disconnection. As previously stated, the drop wheels 34 must be lowered to the full ground-engaging position shown in Fig. 9 before the safety latch 81 is swung to the free position so that there is no danger of the tractor moving away from the trailer and the front end of the trailer being unsupported. Also, during the forward movement of the sliding block 44, the stops 72 carried by the swinging arms 70 will swing back of the sliding block 44 so that there is no danger of the drop wheels swinging upwardly to inoperative position and thus allowing the front end of the trailer to fall until the tractor has again been backed under the trailer to support the forward end thereof.

The operation of my device is as follows: Assuming that the drop wheels 34 are in ground-engaging position as shown in Fig. 9 and that the forward end of the trailer is supported thereby, the tractor is backed under the trailer whereupon the plate 41 will, at the forward end thereof, slide up on the plate 17 carried by the tractor and on to the rearwardly tilted fifth wheel 15 which will level itself on the pivot 16 as the front end of the trailer is received to permit the king pin 18 to enter the slot 43 formed in the front cross member 25 and pass beneath the safety latch 81 into engagement with the sliding block 44 at the rear end of the slot 45 formed therein. The king pin will move the sliding block 44 rearwardly a short distance before entering between the cam members 75 carried by the pivoted arms 70 whereupon the cam members 75 will spread the arms 70 against the tension of the spring 74 to swing the stops 72 out of the path of movement of the sliding block 44.

The tractor frame is by this time firmly seated on the fifth wheel 15 and during rearward movement of the tractor the drop wheels 34 will move upwardly by the rearward movement of the sliding block 44 through the connection therewith comprising the bar 50, links 53 and 53′, the swinging arm 57 and the links 60. The king pin will be moved rearwardly until it abuts against the front face of the tongue 96 on the plunger 95 which will be carried rearwardly therewith to release the tongue 97 from the slot 98 formed in the coupling member 90 so that the coupling member 90 will rotate substantially 90° in a clockwise direction from king pin receiving position to locked position by the influence of the spring 107 attached at one end to the operating lever 105 and at opposite ends of the frame cross member 24. The drop wheels 34 have at this time been elevated to full inoperative position, the king pin locked in the coupling member and the connection made so that the tractor supports the front end of the trailer and is firmly coupled therewith.

When it is desired to disconnect the tractor from the trailer, the operator will pull on the handle 106 on the operating lever 105 and swing the coupling member 90 to releasing position which is held in that position by the tongue 97 formed on the plunger 95 engaging in the slot 98 formed in the coupling member 90. The tractor and with it the king pin 18 can then move forwardly to a position which may be just rearwardly of the safety latch member 81. During this forward movement of the king pin, the drop wheels 34 will move downwardly by gravity and due to the connection of the drop wheels with the sliding block 44 through the links 60, swinging arm 57, links 53 and 53′ and the bar 50, the sliding block 44 will move forwardly following the king pin in that forward movement. As the drop wheels 34 approach the position shown in Fig. 8, the spring 113 operatively connected with the frame cross member 21 and the link 112 pivotally connected to the forwardly extending arm 110 on the swinging arm 57, will cause the drop wheels to move to the position so that the supports 36 therefor will be in a substantially vertical position as shown in Fig. 9.

During this movement the sliding block 44 will swing the arms 70 outwardly to move the stops 72 out of the path of movement of the sliding block 44 until it passes the stop 72 whereupon they will again move into the path of movement of the sliding block 44 by the action of the spring 74. The sliding block 44 also will pass under the side arms of the safety latch member 81, thus swinging the same to the elevated position to permit the king pin 18 to pass therebeneath and then through the slot 43 formed in the front frame member 26 whereupon the tractor is fully disconnected from the trailer and the trailer is supported at its forward end by the drop wheels 34 which are not permitted to collapse and allow the front end of the trailer to drop due to the toggle formed by the swinging arm or bracket 57 and the links 60 having moved to an extended position slightly past dead center so that the pivot 62, forming the apex of the toggle becomes a stop member for the movement thereof upon engaging the links 53 and 53'. This arrangement insures the drop wheels against displacement by any stresses applied at the wheels yet permits the toggle locks to be broken readily when the links 53 and 53' move rearwardly through the engagement of the king pin 18 with the slide block 44 in the normal manner described hereinbefore. It will be apparent that with this arrangement the coupling mechanism is entirely free of any of the load carrying stresses assumed by the drop wheels.

It will also be noted that the stops 72 positioned rearwardly of the sliding block 44 connected with the drop wheels form an additional safeguard against their collapse if for any reason the load is placed upon them prior to the positioning of the linkage just described and further, that not until either or both of the aforementioned safety features are in operative position, is it possible to get the tractor out from underneath the forward end of the trailer.

While I have shown and described somewhat in detail a preferred embodiment of my invention, it will be understood to those skilled in the art that formal changes and changes relating to details of construction and methods of manufacture may be resorted to without departing from the spirit and substance of my invention, the scope of which is commensurate with the sub-joined claims.

What I claim is:

1. A trailer having, in combination, a frame, means supporting the rear end of said frame, an auxiliary support for the front end of said frame comprising a slidable carriage, and wheels pivotally supported by said frame operatively connected with said carriage, said wheels moving by gravity from inoperative position toward ground-engaging position sliding said carriage forwardly therewith, and spring means causing said wheels to move from gravity actuated position to full operative position and said carriage to move to full forward position.

2. A trailer having, in combination, a frame, means supporting the rear end of said frame, an auxiliary support for the front end of said frame comprising, a support carrying wheels pivotally supported by said frame, a toggle pivoted at its ends to said support and frame, said support and wheels moving by gravity from inoperative position toward ground-engaging position, and spring means causing said wheels to move from gravity actuated position to full operative position and the intermediate toggle pivot to move past dead center to thereby brace said wheels against accidental movement toward inoperative position.

3. A trailer having, in combination, a frame, means supporting the rear end of said frame, an auxiliary support for the front end of said frame comprising, a support carrying wheels pivotally supported by said frame, a toggle pivoted at its ends to said support and frame, said support and wheels moving by gravity from inoperative position toward ground-engaging position, spring means causing said wheels to move from gravity actuated position to full operative position and the intermediate toggle pivot to move past dead center, and means operatively connected with said toggle to limit the movement thereof past dead center when said wheels are moved to full operative position.

4. A trailer having, in combination, a frame, means supporting the rear end of said frame, an auxiliary support for the front end of said frame comprising, a support carrying wheels at the free end thereof pivotally supported by said frame movable to a substantially vertical operative position, a toggle pivoted at its ends adjacent to the free end of said support and to said frame, said support moving by gravity from inoperative position toward vertical position, and spring means extending from said frame to said toggle causing said support to move from gravity actuated position to the substantially vertical position and the intermediate toggle pivot past dead center to thereby brace said support and wheels against accidental movement toward inoperative position.

5. A tractor and semi-trailer having, in combination, a tractor section, a king pin on said section, a trailer section, an auxiliary wheel support for said trailer, a sliding head operatively connected with said support adapted to be moved rearwardly by said king pin, locking members to restrain said head against accidental rearward movement, means engageable with said king pin to unlatch said locking members after the initial rearward movement of said head, means to lock said king pin to said trailer at the end of the rearward movement of said head, and means to move said sliding head forwardly independently of any force exerted by said king pin.

6. A tractor and semi-trailer having, in combination, a tractor section, a king pin on said section, a trailer section having a frame, an auxiliary wheel support pivotally carried by said frame, a sliding head slidable on said frame operatively connected with said support adapted to be moved rearwardly by said king pin, latch members pivotally supported by said frame to restrain said head against accidental rearward movement when in its forward position, cam members engageable with said king pin to release said latch members upon rearward travel of said head and king pin but after the initial rearward movement of said head, and means to lock said king pin to said trailer at the end of the rearward movement of said head.

7. A tractor and a semi-trailer having, in combination, a tractor section, a king pin on said section, a trailer section having a frame, an auxiliary wheel support pivotally carried by said frame, a head slidable on said frame operatively connected with said support adapted to be moved rearwardly by said king pin to move said wheel support to inoperative position, means supported by said frame to restrain said head against accidental rearward movement, means operated by said king pin during rearward travel thereof and after initial rearward movement of said head to release said restraining means, and rotatable means to lock said king pin to said trailer at the end of the rearward movement of said head.

8. A tractor and a semi-trailer having, in combination, a tractor section, a king pin on said section, a trailer section having a frame, an auxiliary wheel support pivotally carried by said frame, a head slidable on said frame operatively connected with said support adapted to be moved rearwardly by said king pin to move said wheel support to inoperative position, said support moving by gravity to partially return said head to forward position upon removal of said king pin from said head, and spring means to complete the return of said head to full forward position.

9. A tractor and a semi-trailer having in combination, a tractor section, a king pin carried thereby, a trailer section having a frame, an auxiliary wheel support pivotally carried by said frame, means operatively connected with said wheel support movable rearwardly by said king pin to move said wheel support from ground-engaging to inoperative positions, and means operating independently any force exerted by said king pin to move said wheel support from inoperative to ground-engaging position.

10. A tractor and a semi-trailer having in combination, a tractor section, a king pin carried thereby, a trailer section having a frame, an auxiliary wheel support pivotally carried by said frame, means operatively connected with said wheel support movable rearwardly by said king pin to move said wheel support from ground-engaging to inoperative positions, means operating independently of any force exerted by said king pin to move said wheel support from inoperative to ground-engaging position, and means engageable with said first means to prevent accidental movement of said wheel support toward inoperative position.

11. A tractor and a semi-trailer having in combination, a tractor section, a king pin carried thereby, a trailer section having a frame, an auxiliary wheel support pivotally carried by said frame, means operatively connected with said wheel support movable rearwardly by said king pin to move said wheel support from ground-engaging to inoperative position, means operating independently of any force exerted by said king pin to move said wheel support from inoperative to ground-engaging postion, and means to prevent disengagement of said king pin from said trailer until said wheel support is in ground-engaging position.

12. A tractor and semi-trailer having, in combination, a tractor section, a king pin on said section, a trailer having a frame, supporting wheels pivotally supported by said frame, and a coupling member operatively connected with said wheels, said wheels moving by gravity from inoperative position toward ground-engaging position causing said coupling member to move toward king pin-receiving position, and means causing said wheels to move from gravity-actuated position to full operative position and said coupling member to move to kingpin-receiving position while said tractor and semi-trailer are being disconnected.

13. A tractor and semi-trailer having, in combination, a tractor section, a king pin on said section, a trailer having a frame, a support carrying wheels pivotally carried by said frame, and a sliding carriage operatively connected with said support, said support and wheels moving by gravity from inoperative position toward ground-engaging position also moving said carriage forwardly, and spring means causing said wheels to move from gravity-actuated position to full ground-engaging position and said carriage to move to king pin-receiving position while said tractor and semi-trailer are being disconnected.

14. A tractor and semi-trailer having, in combination, a tractor section, a king pin on said section, a trailer having a frame, a support carrying wheels pivotally carried by said frame, and a coupling member operatively connected with said support, said support and wheels moving by gravity from inoperative position toward ground-engaging position thereby moving said coupling member forwardly, and spring means causing said wheels to move from gravity-actuated position to full operative position and said coupling member to move to king pin-receiving position while said tractor and semi-trailer are being disconnected.

15. A tractor and semi-trailer having, in combination, a tractor section, a king pin on said section, an auxiliary wheel support for said trailer, a sliding head operatively connected with said support adapted to be moved rearwardly by said king pin, locking members to restrain said head against accidental rearward movement, means engageable with said king pin to unlatch said locking members after the initial rearward movement of said head, means to lock said king pin to said trailer at the end of the rearward movement of said head, and means to release said king pin from said trailer at the rearward position of said sliding head.

16. A tractor and semi-trailer having, in combination, a tractor section, a king pin on said section, a trailer having a frame, an auxiliary wheel support pivotally carried by said frame, a head slidable on said frame operatively connected with said support adapted to be moved rearwardly by said king pin to move said wheel support to inoperative position, means supported by said frame to restrain said head against accidental rearward movement, means operated by said king pin during rearward travel thereof and after initial rearward movement of said head to release said restraining means, rotatable means to lock said king pin to said trailer at the end of the rearward movement of said head, and means to release said king pin from said trailer at the rearward position of said sliding head.

17. A tractor and semi-trailer having, in combination, a tractor section, a king pin on said section, a trailer having a frame, an auxiliary wheel support pivotally carried by said frame, a head slidable on said frame operatively connected with said support movable rearwardly by said king pin to move said wheel support to inoperative position, means to release said king pin from said head at the rearward position of the latter, said support moving by gravity to partially return said head to forward position, and spring means to complete the return of said head to full forward position while said tractor and semi-trailer are being disconnected.

18. A tractor and semi-trailer having, in combination, a tractor section, a king pin carried thereby, a trailer having a frame, an auxiliary wheel support pivotally carried by said frame, means operatively connected with said wheel support movable rearwardly by said king pin to move said wheel support from ground-engaging position to operative position, means to release said king pin from said first means at the rearward position of said first means, and means operating independently of said king pin to move said wheel support from inoperative to ground-engaging position while said tractor and semi-trailer are being disconnected.

JOHN S. EDWARDS.